(12) United States Patent
Zhou et al.

(10) Patent No.: US 6,198,647 B1
(45) Date of Patent: Mar. 6, 2001

(54) TWELVE-PHASE TRANSFORMER CONFIGURATION

(75) Inventors: Dongsheng Zhou, Cedarburg; Nickolay N. Guskov, Mequon; Gary L. Skibinski, Milwaukee, all of WI (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/627,810

(22) Filed: Jul. 28, 2000

(51) Int. Cl.[7] .................................................. H02M 5/06
(52) U.S. Cl. ............................................................ 363/154
(58) Field of Search ..................................... 363/148, 152, 363/153, 154, 46; 323/361

(56) References Cited

U.S. PATENT DOCUMENTS

| | | | |
|---|---|---|---|
| 4,106,089 | * | 8/1978 | Fettinger ............................... 363/153 |
| 4,255,784 | * | 3/1981 | Rosa ...................................... 363/129 |
| 4,876,634 | * | 10/1989 | Paice ......................................... 363/5 |
| 5,148,357 | * | 9/1992 | Paice ......................................... 363/5 |
| 5,420,782 | * | 5/1995 | Luce et al. .............................. 363/109 |
| 5,537,309 | * | 7/1996 | Marsh et al. ............................ 363/155 |
| 5,539,632 | * | 7/1996 | Marsh ..................................... 363/155 |
| 5,731,971 | * | 3/1998 | Owen ...................................... 363/154 |

* cited by examiner

*Primary Examiner*—Adolf Deneke Berhane
(74) *Attorney, Agent, or Firm*—Michael A. Jaskolski; John J. Horn; William R. Walbrun (57) ABSTRACT

The invention includes an autotransformer for converting three-phase AC power to twelve-phase AC power using only three coils (e.g., no primary or dead windings are required). The autotransformer includes three coils, each coil including a plurality of serial windings that together form a polygon. Twelve output nodes are provided between adjacent winding pairs, the windings sized and arranged such that adjacent output voltages are separated by 30 degree phase shift and such that output voltage magnitudes are essentially identical. In some embodiments step-up, step-down and unity gain input node sets are provided while in other embodiments unity gain and either step-up or step-down input node sets are provided. The invention also includes an isolation transformer configuration that uses a secondary configuration that is identical to inventive autotransformer configurations.

25 Claims, 7 Drawing Sheets

TWELVE-PHASE TRANSFORMER CONFIGURATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to transformers for converting three-phase power to nine-phase power, and more particularly to transformers for providing reduced harmonics on the AC and minimizing ripple on the DC side of an AC to DC rectifier.

Rectifiers are used to rectify AC voltages and generate DC voltages across DC buses. A typical rectifier includes a switch-based bridge including two switches for each AC voltage phase which are each linked to the DC buses. The switches are alternately opened and closed in a timed fashion that, as the name implies, causes rectification of the AC voltage. As well known in the energy industry the global standard for AC power distribution is three phase and therefore three phase rectifier bridges are relatively common.

When designing a rectifier configuration there are three main considerations including cost, AC line current harmonics and DC bus ripple. With respect to AC current harmonics, when an AC phase is linked to a rectifier and rectifier switches are switched, the switching action is known to cause harmonics on the AC lines. AC line harmonics caused by one rectifier distort the AC voltages provided to other commonly linked loads and therefore should generally be limited to the extent possible. In fact, specific applications may require that large rectifier equipment be restricted in the AC harmonics that the equipment produces.

With respect to DC link ripple, rectifier switching typically generates ripple on the DC bus. As with most hardware intensive configurations cost can be minimized by using a reduced number of system components and using relatively inexpensive components where possible.

It is well known in AC to DC rectification that AC current harmonics and DC ripple may be improved by increasing the number of AC phases that are rectified by the rectifier. These AC phases are phase-shifted from each other. For example, by rectifying twelve-phase AC current instead of three-phase harmonics and ripple are reduced appreciably. Where AC harmonic restrictions are placed on rectifier systems such restrictions are often satisfied by employing a 24-pulse rectifier that requires a twelve-phase source of AC power. As the global standard for AC power distribution is three phase, 24-pulse rectifiers require three-to-twelve phase power converters between utility supply lines and rectifier switches.

Isolation transformers for converting three-phase AC power to twelve-phase AC power are known in the art but have several shortcomings. First isolation transformers must be rated for the full power required. Second, isolation transformers are typically relatively large as separate primary and secondary windings are required for isolation purposes.

Where isolation between a utility supply and a rectifier is not required, employing an autotransformer including a plurality of series and common windings may advantageously reduce the size and weight of a three-to-twelve phase converter that consists of an autotransformer and a rectifier unit. Exemplary three-to-twelve phase autotransformers are described in U.S. Pat. No. 5,148,357 (the "'357 patent"); and U.S. Pat. No. 4,876,634 (the "'634 patent"), each of which is incorporated herein for the purpose of describing the prior art.

The '634 patent teaches the general concept of providing three phase autotransformer coils in a plurality of series connected windings which are arranged to form a hexagon. Three phase AC input lines are linked to three input nodes and twelve output nodes provide voltages to rectifier bridges. Phase shift between the output voltages is accomplished by providing differently sized windings between the input nodes and the output nodes. Importantly, the '634 patent teaches that, for each autotransformer input phase, the phase shift between four corresponding output voltages should be 15 degrees and accomplishes 15 degree phase shift by providing short windings between each two adjacent output nodes corresponding to the same input phase. Long windings are provided between adjacent output nodes corresponding to different input phases. In the '634 patent the twelve output voltages are provided to several bridges.

Unfortunately, there are at least two problems with the 24-pulse autotransformer described in the '634 patent (hereinafter the '634 topology). First, there is an inherent impedance mismatch in the '634 topology which results in looping currents among the bridges and which requires additional hardware to correct. For example, if the outputs and inputs to the '634 24-pulse autotransformer are linked to provide unity gain one of the bridges would be fed directly from the input power source while the other bridges would be fed through transformer windings which each are characterized by a certain amount of leakage inductance. This means that there would be different impedances for each of the bridges and the different impedances would cause disparate DC output voltages and hence looping currents among the bridges. A similar impedance disparity would results when the '634 patent 24-pulse autotransformer is linked for step-down transformation.

The '634 topology teaches use of two inter-phase transformers to reduce the looping currents. As an initial matter Applicant believes the inter-phase transformers provided in the '634 topology are erroneously specified and that more than the two specified inter-phase transformers would be required to reduce the looping currents. While additional inter-phase transformers can be provided, inter-phase transformers are required to carry DC bus currents. Therefore, inter-phase transformers are relatively bulky and increase system size appreciably. Moreover, additional inter-phase transformers are relatively expensive and increase system costs.

Second, the '634 topology would result in current sharing problems among the bridges due to enclosed electrical circuits formed by the multi-phase shift bridges. The current sharing problems are exacerbated when AC line harmonics occur as different source harmonics substantially change bridge current sharing. Because AC line harmonics are often irregular and unpredictable it is impossible to balance the impedance mismatch via addition of resistance elements. While the inter-phase transformers may ease current harmonics to the power source, the inter-phase transformers are not effective as a solution for the current sharing problem.

Because of the current sharing problem described above all of the bridges in the '634 topology have to be capable of handling over-rated current conditions as high as 150% of the current level required to be handled if the bridges were able to share current equally. This is because from time to time each bridge is forced to operate close to its rated current level while the other bridges only operate at 50% of their rated level. This drastic current difference among bridges also forces the windings of the '634 topology to carry appreciably disparate current magnitudes. For this reason, in addition to the bridges having high current ratings, the autotransformer also must be rated to handle high current value and therefore results in inefficient material utilization.

One solution to the looping and sharing current problems associated with the '634 topology is to provide an autotransformer that equally spaces output voltages in phase. For example, where there are twelve outputs the outputs can be phase shifted from each other by 30 degrees each. In the '357 patent this is accomplished by providing an autotransformer having three coils that are phase shifted from each other by 120 degrees. Each coil forming first through sixth coil specific windings. The windings are arranged to form six separate legs, the first coil first through third windings forming a first leg and the fourth through sixth windings forming a fourth leg, the second coil further through third windings forming a second leg and the fourth through sixth windings forming a fifth leg and the third coil first through third windings forming a third leg and the fourth through sixth windings forming a sixth leg. The legs are arranged in series first through sixth to form a hexagon. The '357 topology also requires a "dead" coil winding to allow free flow of the third and triple harmonic currents.

While the '357 topology eliminates the current sharing and looping problems discussed above, the required dead coil windings result in a relatively expensive transformer configuration.

In addition to the problems discussed above, often specific DC loads require different DC magnitudes. For example, in some cases a DC load may require a DC magnitude that is essentially identical to the AC supply magnitude, in other cases a DC load may require a stepped down DC magnitude that is less than the supply AC magnitude while in still other cases the load may require a stepped up DC magnitude that is greater than the supply AC magnitude. One solution to this dilemma is to manufacture several different transformers, one transformer for each of the different load requirements. This solution, however, is relatively expensive as several designs are required and the expenses associated with manufacturing several different transformer designs can be appreciable.

Despite the relatively large size of isolation transformers, sometimes specific applications require isolated primary and secondary windings. In the isolated transformer topologies many of the same design concerns have to be considered. For example, isolation transformers should be designed so as to minimize input current harmonics, minimize DC bus voltage ripple, eliminate bus current sharing problems, reduce overall transformer size and minimize required materials thereby reducing cost.

Another way to reduce transformer design and manufacturing costs is to design winding configurations that can be used to configure several different transformer types for different transformation requirements. For example, one 12 phase isolation transformer is taught in U.S. Pat. No. 4,255, 784 ("the '784 patent" or "'784 transformer") titled "Transformer-Rectifier Apparatus" which issued on Mar. 10, 1981. The '784 transformer includes a three phase primary and a secondary that is essentially the same design as the autotransformer configuration in the '357 patent. Thus, to reduce overall design and manufacturing costs a multi-purpose winding configuration could be constructed that has the form of the secondary winding in the '784 patent and the multi-purpose configuration could then be used, as required, to configure either an isolation transformer as taught in the '784 patent or an autotransformer including a dead winding as taught in the '357 patent. Unfortunately most winding configurations have not been designed such that they can fill such dual purpose roles.

Thus, it would be advantageous to have a three-to-twelve phase transformer that did not cause looping and sharing current problems and that is relatively inexpensive to construct. In the case of an autotransformer it would be advantageous if the transformer could be used to provide more than one type of transformation action. For example, it would be advantageous if the autotransformer could be used for both unity gain and step-up transformation or for both unity gain and step-down transformation. Moreover, it would be advantageous to have a winding configuration that achieves the goals identified above and yet could be used in several different transformer configurations such as an isolation transformer and an autotransformer.

SUMMARY OF THE INVENTION

The present invention includes an autotransformer for transforming three phase AC input voltages to twelve-phase AC output voltages wherein the transformer includes only three coils (i.e., no primary and no dead windings), each coil forming a plurality of series windings, the windings arranged to form a polygon. Nodes between the windings form twelve output nodes. The windings are sized and configured such that the voltage magnitudes at the output nodes are identical, adjacent output nodes are separated by 30 degree phase shifts and the nodes in the input set are 120 degrees out of phase (i.e., the second node in each input set is 120 degrees out of phase with the first and third nodes in the set and the third node is 120 degrees out of phase with the first node in the set).

Thus, one object is to provide an autotransformer that avoids the looping and current sharing problems discussed above. To this end, because the output voltages have identical magnitudes and are equi-phase-shifted (i.e., adjacent output node voltages are 30 degrees out of phase), looping and current sharing problems are essentially eliminated.

Another object is to achieve the aforementioned object relatively inexpensively. To this end the present autotransformer does not require a central dead winding. Thus, less winding material is required to provide the desired transformation results.

One other object is to provide a step-down transformer that avoids the looping and current sharing problems. To provide a step-down autotransformer one embodiment of the present invention provides a step-down input set of input nodes where the magnitudes of voltages at the step-down input set are greater than the magnitudes at the output nodes.

Yet another object is to provide a single autotransformer that can be used as a step-down transformer, a step-up transformer, or as a unity gain transformer. This feature enables a manufacturer to provide a single transformer that can be used in three different applications and therefore reduces design and manufacturing costs as only a single autotransformer has to be designed and manufactured instead of three different autotransformers.

Another object is to provide an autotransformer that can be used for both step-up and unity gain transformation. To this end another inventive autotransformer configuration provides both a unity gain input set and a step-up input set (e.g. the step-up node voltage magnitudes are each less than the output voltage magnitudes). Once again, this configuration provides two different transformer gains for the cost of designing and manufacturing a single topology.

The invention also includes an isolation transformer having three input lines linked to a primary and twelve outputs linked to a secondary. The primary may be in either a delta or a Wye form including three primary windings separated by 120° phase shift. The secondary preferably has twelve output nodes having identical voltage magnitudes and at least three other nodes that have identical voltage magnitudes that are less than the output node voltage magnitudes and are separated by 120° phase shifts. With this configuration the advantages of the autotransformers discussed above are achieved while providing electrical isolation for applications that require isolation. In addition, with this configuration the secondary may be used to construct either an isolation transformer as described or a step-up/unity gain autotransformer. This multi-purpose design reduces both design and manufacturing costs.

A complete understanding of the present invention will be obtained from the following description and the accompanying figures.

DETAILED DESCRIPTION OF THE INVENTION

The invention includes several autotransformer configurations and isolation transformer configurations.

Autotransformer Configurations

Figure 1:
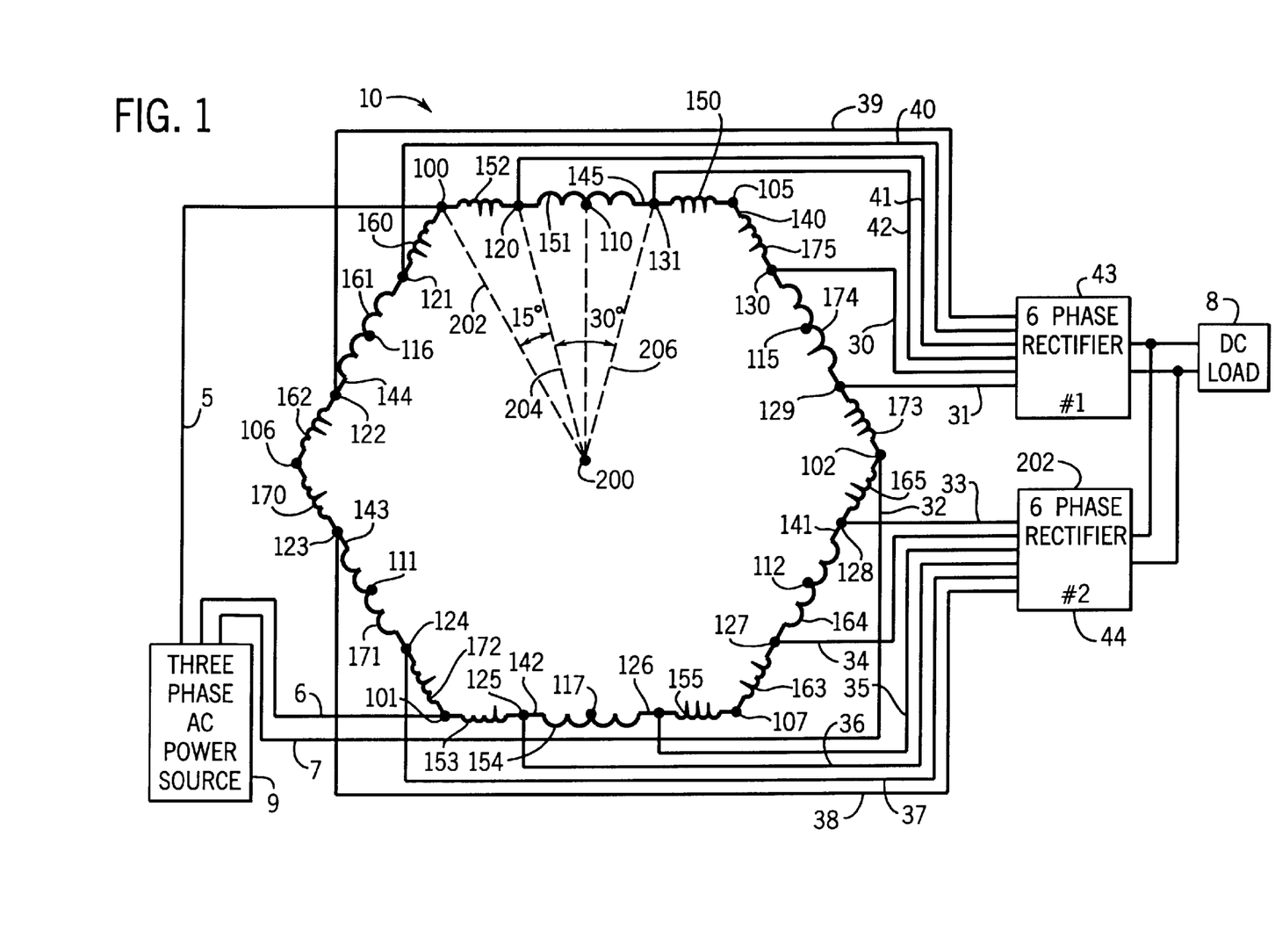
FIG. 1 is a schematic diagram of an embodiment of the inventive autotransformer including eighteen windings arranged to form a step-down/step-up and unity gain transformer, the transformer linked to an input three phase supply, two six-phase converters and a DC load.

Referring now to the drawings wherein like reference numbers throughout the several views correspond to similar or like components and, specifically referring to FIG. 1, a first embodiment of the invention includes inventive autotransformer 10 is illustrated in an exemplary environment. Transformer 10 is shown linked to a 3-phase AC source 9 via three input or supply lines 5, 6 and 7 and is also linked via twelve output lines 30, 31 and 33 through 42, respectively, to first and second 6-phase rectifiers 43, 44, respectively, and a DC load 8. Rectifiers 43 and 44 and other rectifier designs are well known in the electrical arts and therefore will not be explained here in detail.

Figure 2:
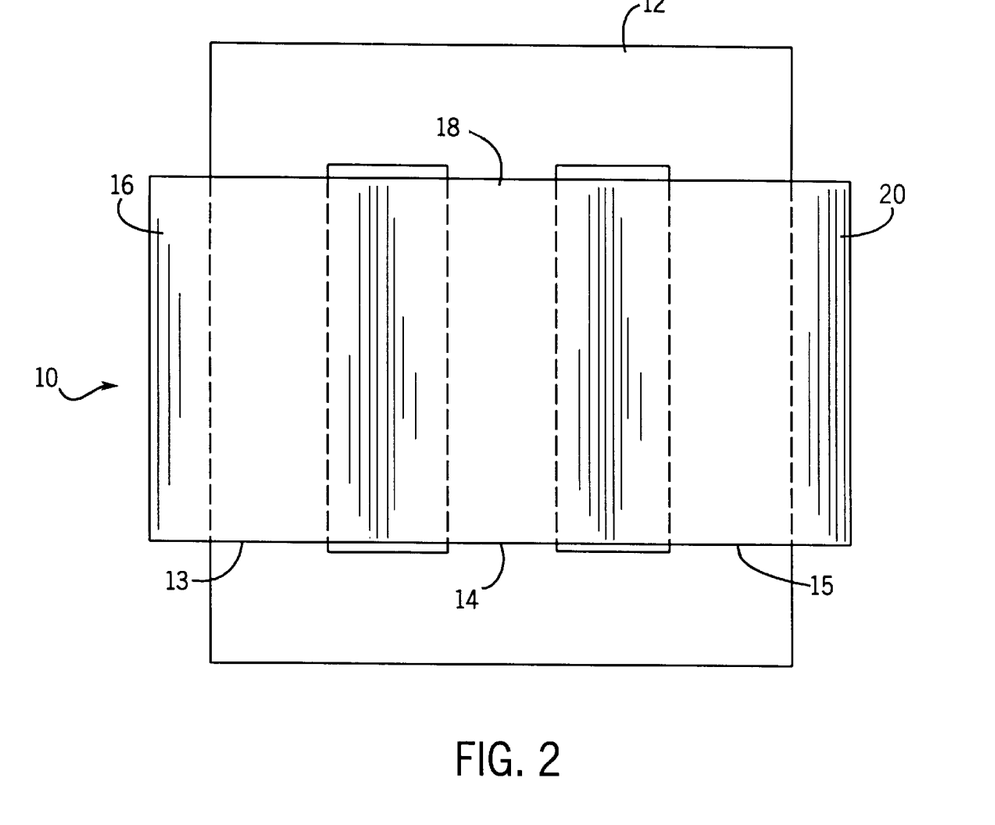
FIG. 2 is a front view of a core and coils of the autotransformer of FIG. 1.
Figure 3:
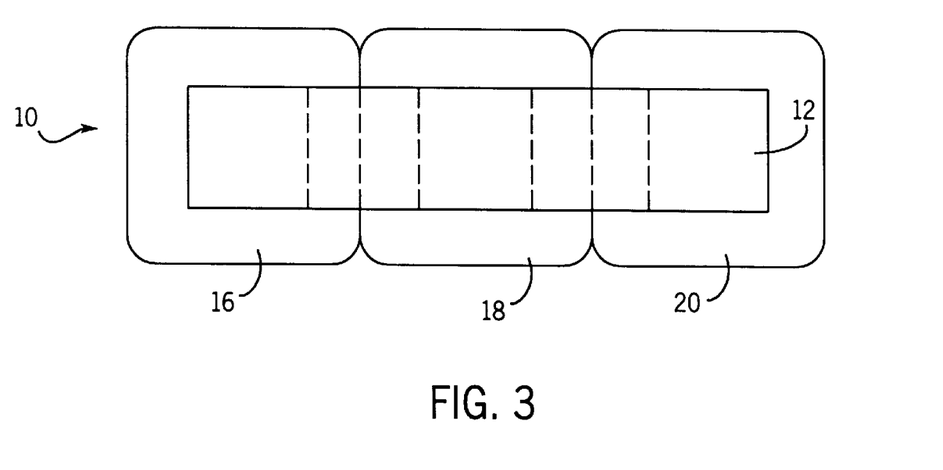
FIG. 3 is a plan view of the core and coils of FIG. 2.

Referring also to FIGS. 2 and 3 autotransformer 10 is constructed on a laminated core 12 of electrical grade steel such as M-6 provided by Armco Incorporated of Middletown, Ohio. The laminated core 12 may have three equal paths or legs 13, 14, 15 for magnetic flux. The core 12 preferably has no other magnetic flux paths than the three traversing poles 13, 14, 15 such that the flux flowing down through one pole (e.g., pole 14) must return upwards through another pole (e.g., pole 13 or 15).

The poles 13, 14 and 15 pass through first, second and third coils 16, 18 and 20, respectively, each coil including a plurality of windings. For example, first coil 16 includes first through sixth windings 175, 174, 173, 172, 171 and 170, the second coil 18 includes first through sixth windings 165–160, respectively, and the third coil 20 includes first through sixth windings 155–150, respectively, as shown in FIG. 1.

Each winding 150–155, 160–165 and 170–175 may be constructed using a single winding specific wire. In the alternative, several series windings may be constructed using a single wire or all of the windings may be constructed using a single wire. For example, windings 175 and 174 may be constructed using a single wire and bringing a center tap out for linking as an output node and perhaps as an input node. Preferably all of the windings have a similar construction, the distinction being primarily in the number of turns that are included in each winding.

Each winding in coil 16 on pole 13 of the core 12 will experience the same induced volts per turn from the flux within pole 13. The same will be true for windings in coil 18 on pole 14 and for windings in coil 20 on pole 15. Therefore, each winding 150–155, 160–165 and 170–175 on the same respective pole 13, 14, 15 will be in phase with one another.

Each winding 150–155, 160–165 and 170–175 has the same polarity provided that the direction of each winding is consistent. For example, assume the right end of each winding 150–155 shown in FIG. 1 is the start end. Then the end of winding 150 joining node 105 and the end of winding 152 joining node 120 are both start ends and so on.

As illustrated, the windings are linked in a series fashion to form a hexagon shape including first through sixth legs, 140, 141, 142, 143, 144, and 145, respectively. The first coil 16 first through third windings 175, 174 and 173 are arranged in series on leg 140, the second coil 18 first, second and third windings 165, 164 and 163 are arranged in series on second leg 141, the third coil first, second and third windings 155, 154 and 153 are arranged in series on third leg 142, the first coil fourth, fifth and sixth windings 172, 171 and 170, respectively, are arranged in series on fourth leg 143, the second coil 18 fourth, fifth and sixth windings 162, 161 and 160, respectively, are arranged in series on fifth leg 144 and the third coil 20 fourth, fifth and sixth legs 152, 151 and 150, respectively, are arranged in series on sixth leg 145. The legs are arranged in series, first through sixth, as illustrated.

Eighteen separate nodes are formed at the joining points between adjacent windings includes nodes 100, 101, 102, 105, 106, 107 and 120–131. Referring still to FIG. 1, the transformer 10 representation can be thought of as a voltage plane wherein distance between any of nodes 100–102, 105–107 or 120–131 and a neutral or origin 200 represents the voltage magnitude at the corresponding node. For example a vector 202 is formed between origin 200 and node 100 that represents voltage magnitude at node 100. A slightly shorter vector 204 is formed between origin 200 and node 120. Thus, comparing vectors 202 and 204 the voltage magnitude at node 120 is clearly less than the voltage magnitude at node 100. Magnitude vector 206 is the same length as vector 204 and therefore the voltage magnitude at node 131 is identical to the voltage magnitude at node 120. Similar voltage magnitude vectors can be drawn for each node in FIG. 1.

The angle between each two vectors (e.g., 204 and 206) represents the phase shift angle between the two node voltages corresponding to the vectors. Twelve of the eighteen nodes in FIG. 1 are output nodes. The twelve output node include first through twelfth output nodes 130, 129, 128, 127, 126, 125, 124, 123, 122, 121, 120 and 131, respectively. Importantly, the windings are arranged and sized such that the phase shift between each two adjacent output node voltages is essentially 30°. For example, the phase angle between voltages at nodes 131 and 120 is 30°. Similarly the phase shifts between voltages at adjacent nodes 120 and 121, 121 and 122, etc., are each 30°.

In addition, the windings are sized and arranged such that voltage magnitude vectors at each output node are identical. For example, each of vectors 202 and 204 have identical lengths and therefore the voltage magnitudes at nodes 120 and 131 are identical.

Autotransformer 10 can be used as a step-down transformer, a step-up transformer or a unity gain transformer. To use transformer 10 as a step-down transformer, either one of two nodes sets can be selected as input nodes to be linked to supply lines 5, 6 and 7. Each of the two input nodes sets that can be used for step-down transformation is separately referred to as a step-down input set. Referring still to FIG. 1, a first step-down input set includes nodes 100, 101 and 102, each of those nodes separated from the other two nodes in the set by 120° phase shift. It should be appreciated that voltage magnitude vector 202 corresponding to input node 100 is longer than the output node voltage magnitude vectors (e.g., 204, 206, etc.). Similarly, although not illustrated, the voltage magnitude vectors corresponding to each of input nodes 101 and 102 are identical to vector 202 and are each longer than the output voltage magnitude vectors. Hence, the resulting output voltage is stepped-down when lines 5, 6 and 7 are linked to input nodes 100, 101 and 102.

The step-down magnitude between primary and secondary voltages is proportional to the ratio of the length of supply and output voltage magnitude vectors in FIG. 1. For example, the step-down magnitude will be proportional to the ratio of the length of vector 204 (i.e., the length of the output vector) to the length of vector 202 (i.e., the length of the supply vector). The following equation can be formulated from the trigonometric relationship in FIG. 1:

$$\frac{V_{sec}}{V_{pri}} = \frac{\overline{204}}{\overline{202}} = \frac{\cos 30°}{\cos 15°} = 0.8966 \qquad \text{Eq.1}$$

Thus, the voltage step-down magnitude is 10.34%. FIG. 1 can also be used to identify the lengths of each of windings 150–155 with respect to the length of the supply voltage magnitude vector 202. The relationships among the lengths of windings 160–165 and 170–175 are the same as among the length of windings 150–155. Using FIG. 1 the following relationships can be developed:

$$\overline{150}=\overline{152}=\overline{153}=\overline{155}=[\sin 30°-\cos 30° \tan 15°]*\overline{202}=0.2679 *\overline{202} \qquad \text{Eq. 2}$$

$$\overline{151}=\overline{154}=2 \cos 30° \tan 15°*\overline{202}=0.4642*\overline{202} \qquad \text{Eq. 3}$$

The lengths expressed in Eqs. 2 and 3 are proportional to the turn ratios of windings 150–155. Thus, for windings 150–155 the turn ratios are:

$$\overline{150}:\overline{151}:\overline{152}:\overline{153}:\overline{154}:\overline{155}=1:1.733:1:1:1.733:1 \qquad \text{Eq. 4}$$

Although non-integer numbers of winding turns can be achieved, integer numbers of turns are preferred to facilitate easy manufacturing. Table 1 lists a sub-set of possible winding turn combinations available to achieve the requires turn ratios indicated above. In addition, a maximum error introduced because of integral winding turn numbers is also indicated.

TABLE 1

| Combination# | $\overline{150}$ | $\overline{151}$ | $\overline{152}$ | $\overline{153}$ | $\overline{154}$ | $\overline{155}$ | Error |
|---|---|---|---|---|---|---|---|
| 1 | 4 | 7 | 4 | 4 | 7 | 4 | 0.46% |
| 2 | 7 | 12 | 7 | 7 | 12 | 7 | 0.49% |
| 3 | 8 | 14 | 8 | 8 | 14 | 8 | 0.46% |
| 4 | 11 | 19 | 11 | 11 | 19 | 11 | 0.15% |

Examining Table 1, it can be seen that combination 4 has the lowest maximum error.

Figure 4:
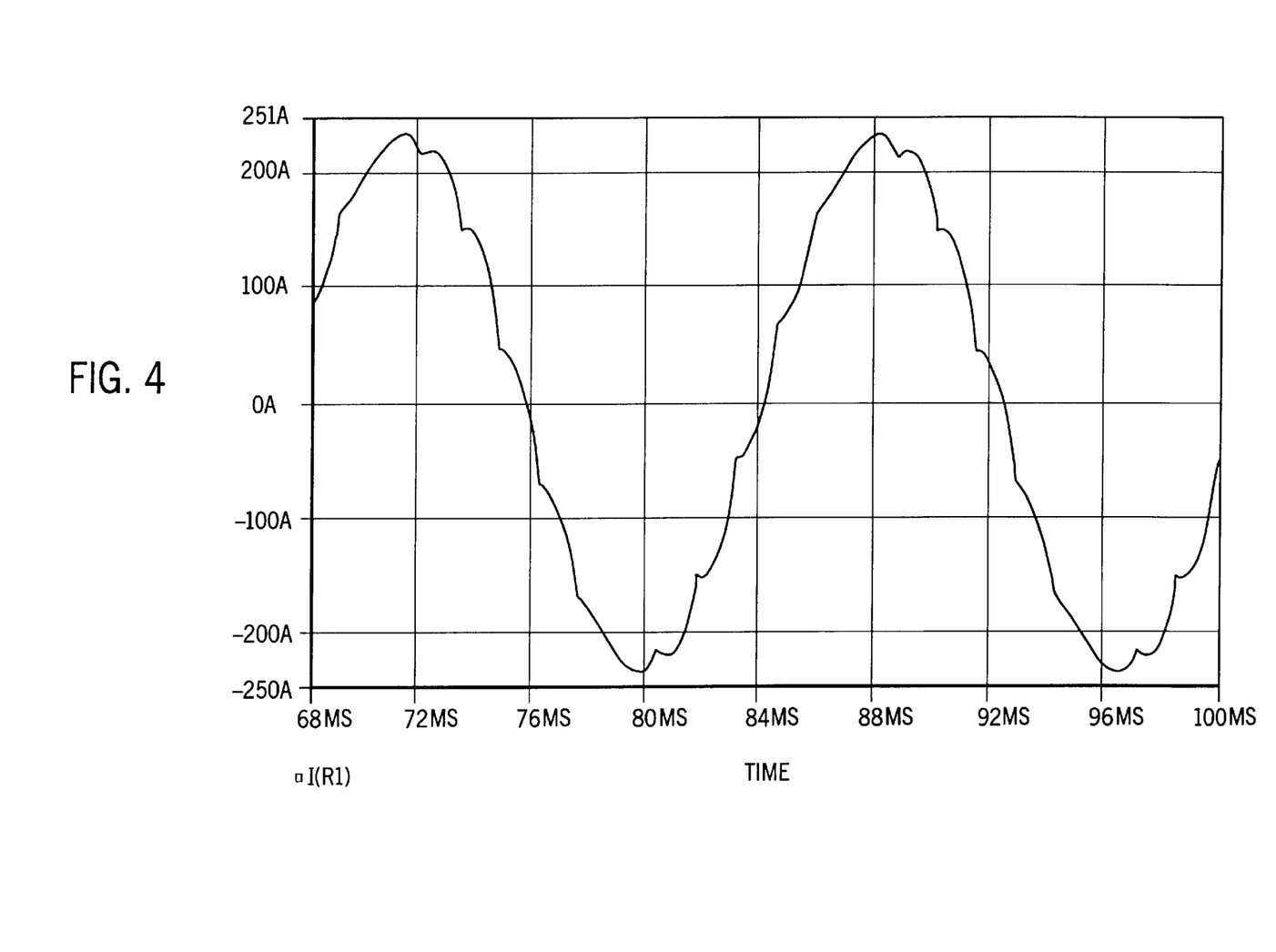
FIG. 4 is a waveform indicative of line current from the three-phase power source of FIG. 1 showing minimal harmonic content that results from use of the inventive autotransformer topology.

Referring now to FIG. 4 and also still to FIG. 1, a line current waveform to power source 9 which results when using the inventive autotransformer configuration 10 is illustrated. The system used to generate the waveform of FIG. 4 was a 100 KVA AC to DC rectifier system. Fourier spectrum analysis of the current waveform in FIG. 4 yields a total harmonic distortion (THD) of 4.5% which is well below the typical 32% associated with the conventional three-phase AC to DC rectifier system. The KVA rating with respect to the DC output used in the configuration of FIG. 1 is calculated to be 0.74 which, when compared to the KVA rating of 2.3 associated with the conventional isolated transformer, is appreciably reduced.

A second step-down input set that causes stepping-down transformation includes nodes 105, 106, and 107. The comments above with respect to nodes 100, 101 and 102 are applicable to this second set of input nodes.

Although not illustrated, transformer 10 can be linked to supply lines 5, 6 and 7 to provide step-up transformation. Herein, each of the step-up input node sets is referred to separately as a step-up input set to differentiate the step-up sets from the step-down and unity gain input sets. A first step-up input set includes nodes 115, 116 and 117, each of those nodes separated by 120° phase-shift and being a mid-winding connection point. Node 115 bi-sects first coil second winding 174, node 116 bisects third coil fifth winding 161 and node 117 bisects second coil second winding 154. It should be appreciated that the input vectors between origin 200 and each of input nodes 115, 116 and 117 is shorter than the output vectors at nodes 120–131. Hence, as the nomenclature indicates, when transformer 10 is linked in this manner the output voltages are stepped-up. The other step-up input set that yields stepped-up transformation includes nodes 110, 111 and 112. Operation of transformer 10 linked to this set of step-up nodes is essentially as described above with respect to nodes 115, 116 and 117.

Transformer 10 can also be linked to supply lines 5, 6 and 7 to provide unity gain. Hererin, each of the unity gain input node sets is referred to separately as a unity gain input set. In addition, while the step-down input nodes were referred to as first, second and third nodes, the unity gain nodes in each set will be referred to as fourth, fifth and sixth nodes to differentiate between the step-down and the unity gain nodes.

A first unity gain input set includes fourth, fifth and sixth nodes 120, 124, and 128, each of the fourth, fifth and sixth nodes separated by 120° phase-shift. It should be appreciated that when transformer 10 is connected or unity gain, voltage magnitude vector 204 corresponding to fourth input node 120 has the same length as the output voltage magnitude vectors (e.g., 204, 206, etc.). Similarly, although not illustrated, the voltage magnitude vectors corresponding to each of the fifth and sixth input nodes 124 and 128, respectively, are identical to vector 204. Hence, as the nomenclature indicates, the voltage gain is unity when transformer 10 is linked in this manner.

Other unity gain input sets that yield unity gain include node set 131, 123 and 127, set 121, 125 and 129 and set 122, 126 and 130. Operation of transformer 10 when linked to each of these unity gain sets is essentially as described above.

Referring once again to FIGS. 1–3, it should be appreciated that the inventive autotransformer configuration only requires three coils 16, 17 and 18 to accomplish the desired transformation and does not require a primary or a separate dead winding configuration as taught by prior art. In addition to having a generally smaller configuration and prior art transformers requiring more than three coils, the present configuration is less expensive than prior art configurations due to the reduced materials required.

Figure 5:
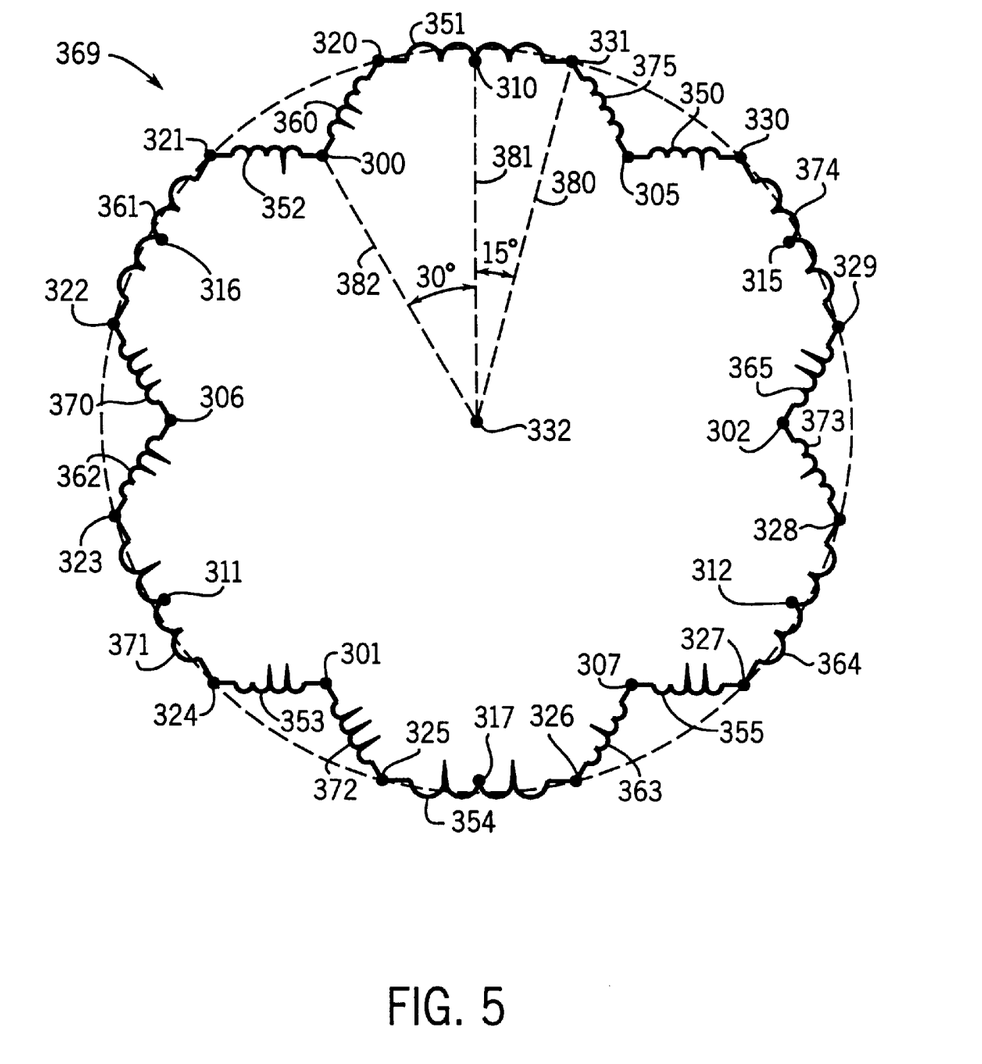
FIG. 5 is a schematic diagram illustrating a second embodiment of an inventive autotransformer configuration for both step-up and unity gain twelve-phase transformers.

Referring now to FIG. 5, therein is illustrated another twelve-phase autotransformer configuration 369 according to the present invention. As in the case of the configuration of FIG. 1, configuration 369 is formed by providing three coils (e.g., sees coils 16, 18 and 20 in FIGS. 2 and 3) on a laminated core having three equal paths or legs for magnetic flux. Once again, each coil includes a plurality of windings. A first coil 16 includes first through sixth windings 375, 374, 373, 372, 371 and 370, the second coil 18 includes first through sixth windings 350, 355, 354, 353, 352 and 351 and the third coil 20 includes first through sixth windings 365, 364, 363, 362, 361 and 360 as shown in FIG. 5. Each winding 350–355, 360–365 and 370–375 has the same polarity provided that the direction of each winding is consistent.

As illustrated, the windings are linked in a series fashion to form a "star" shape including first through eighteenth legs corresponding to windings 375, 350, 374, 365, 373, 364, 355, 363, 354, 372, 353, 371, 362, 370, 361, 352, 360 and 351, respectively. Eighteen separate nodes or connection points are formed at joining point between adjacent windings including nodes 300, 301, 302, 305, 306, 307 and 320–331. Referring still to FIG. 5, the transformer configuration 369 representation can be thought of as a voltage plane wherein distance between any of the nodes and a neutral or origin 332 represents the voltage magnitude at the corresponding node. For example, vector 382 is formed between origin 332 and node 300 and represents the voltage magnitude at node 300. Similarly, vectors 381 and 380 represent the voltage magnitudes at nodes 310 and 331, respectively.

As in the case of FIG. 1, in FIG. 5 the angle between two vectors (e.g., 382, and 381) represents a phase-shift angle between two corresponding nodes. Twelve of the fifteen nodes in FIG. 5 are output nodes. The twelve output nodes include first through twelfth output nodes 330, 329, 328, 327, 326, 325, 324, 323, 322, 321, 320 and 331, respectively. Importantly, the windings are arranged and sized such that phase-shift between each two adjacent output node voltages is essentially 30°. For example, the angle between vectors corresponding to output nodes 320 and 331 is 30°. Similarly, the windings are sized and arranged such that the voltage magnitude vectors at each output node are identical. For example, each of the vectors corresponding to output nodes 320 and 331 are the same length.

Configuration 369 can be used as either a step-up transformer or as a unity gain transformer. To use configuration 369 as a step-up transformer, either one of two node sets can be selected as input nodes to be linked to supply lines (e.g., see lines 5, 6 and 7 of FIG. 1). The two step-up input node sets include set 300, 301, and 302 and set 305, 306 and 307.

The step-up magnitude between primary and secondary voltage is proportional to the ratio of the lengths of supply and output voltage magnitude vectors in FIG. 5. For example, the step-up magnitude will be proportional to the ratio of the length of vector 380 (i.e., the length of the output vector) to the length of vector 382 (i.e., the length of a supply vector). The following equation can be formulated from the trigonometric relationships of FIG. 5:

$$\frac{V_{sec}}{V_{pri}} = \frac{\overline{380}}{\overline{382}} = \frac{1}{\frac{\cos 30°\tan 15°}{\sin 30°} + [\sin 30° - \cos 30°\tan 15°]} = 1.366 \qquad \text{Eq. 5}$$

Thus, the voltage step-up magnitude is 36.6%. Yet another step-up ratio is possible by using two other input sets including set 310, 311, 31 or set 315, 316 and 317. The step-up ratio is the length ratio between vectors 380 and 381, and can be expressed as:

$$\frac{V_{sec}}{V_{pri}} = \frac{\overline{380}}{\overline{381}} = \frac{1}{\cos(15°)} = 1.035 \qquad \text{Eq. 7}$$

The turn ratios among windings in the configuration 369 are essentially the same as the turn ratios corresponding to the windings of FIG. 1. Thus, with respect to windings 350–355, the following relation is true:

$$\overline{350}{:}\overline{351}{:}\overline{352}{:}\overline{353}{:}\overline{354}{:}\overline{355} = 1{:}1.733{:}1{:}1{:}1.733{:}1 \qquad \text{Eq. 8}$$

The relationships among the lengths of windings 360–365 and 370–375 are the same as among the lengths of windings 350–355.

Configuration 369 can also be linked to supply lines to provide unity gain. To this end, four unity gain input node sets are formed by configuration 369 including set 320, 324 and 328, set 331, 323 and 327, set 321, 325 and 329 and set 322, 326 and 330.

Importantly, as in the case of the configuration in FIG. 1, with configuration 369 of FIG. 5, primary and dead winding coils are not required and therefore both size and cost of the transformer are reduced appreciably.

Figure 6:
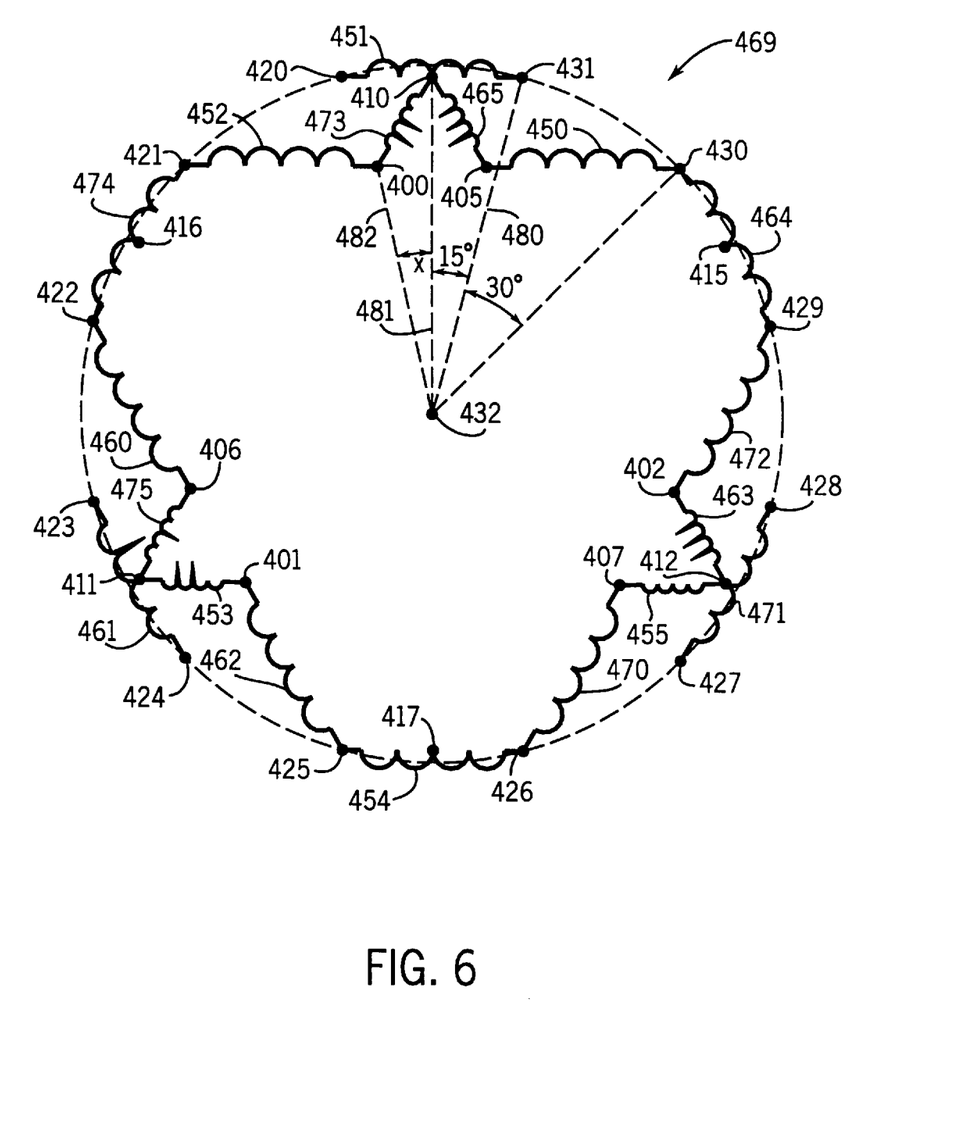
FIG. 6 is similar to FIG. 5, albeit illustrating a third embodiment.

Referring now to FIG. 6, yet another inventive configuration 469 is illustrated. Referring also to FIGS. 2 and 3, configuration 469 is constructed using three coils 16, 18 and 20 wound on a laminated core 12 having three legs 13, 14 and 15. Each coil 16,18 and 20 forms a plurality of windings. First coil 16 forms first through sixth windings 465, 464,

463, 462, 460 and 461, second coil 18 forms first through sixth windings 450, 455, 454, 453, 452 and 451 and third coil 20 forms first through sixth windings 472, 470, 475, 474, 473 and 471, respectively. Once again, each of the windings in configuration 469 has the same polarity provide the direction of each windings is consistent.

As illustrated, each of the first through fifth windings of each of the first, second and third coils 16, 18 and 20, respectively, are linked in a series fashion to form a "star" shape including fifteen separate legs corresponding to windings 465, 450, 464, 472, 463, 455, 470, 454, 462, 453, 475, 460, 474, 452 and 473, respectively.

Fifteen separate nodes are formed at joining points between adjacent windings including nodes 400, 401, 402, 405, 406, 407, 410, 411, 412, 421, 422, 425, 426, 429 and 430. As in the case of the configurations of FIGS. 1 and 5, the configuration 469 representation in FIG. 6 can be thought of as a voltage plane wherein distance between any of the nodes and a neutral or origin 432 represents the voltage magnitude at the corresponding node. Similarly, the angle between two vectors (e.g., 482, 481) represents a phase-shift angle between the two nodes. Six of the nodes formed by the series linked windings form output nodes, the output nodes including nodes 421, 422, 425, 426, 429 and 430. Adjacent output nodes 421 and 422 are separated by 30° of phase-shift. Similarly, output nodes 425 and 426 and output nodes 429 and 430 are each separated by 30° of phase-shift.

The windings are also sized and configured such that three intermediate nodes 410, 411 and 412 are each separated by 45° from adjacent series winding output nodes. For example, intermediate node 410 is separated by 45° of phase-shift from each of output nodes 421 and 430. Similarly, intermediate 411 is separated by 45° of phase-shift from each of output nodes 422 and 425 and node 412 is separated by 45° of phase-shift from each of output nodes 426 and 429.

Referring still to FIG. 6, each of the first, second and third coil sixth windings 461, 451 and 471, respectively, have center tap points which are linked to the intermediate nodes. For example, the center tap point of sixth winding 461 is linked to intermediate node 411, the center tap point of sixth winding 451 is linked to intermediate node 410 and the center tap point of sixth winding 471 is linked to intermediate point 412. In effect, each of the center tap points may be thought of as separating a corresponding sixth winding into sixth and seventh separate windings (not separately numbered). Each of the sixth windings is sized and arranged such that the distal ends of the windings form two additional output nodes. For example, sixth winding 461 forms output nodes 423 and 424, sixth winding 451 forms output nodes 420 and 431 and sixth winding 471 forms output nodes 427 and 428. Once again the windings are sized and arranged such that the voltage magnitudes at each of output nodes 420, 431, 423, 424, 427 and 428 are identical to the voltage magnitudes of output nodes 421, 422, 425, 426, 429 and 430. Also, similarly, sixth windings 451, 461 and 471 are sized and arranged such that the phase-shift between each two adjacent output nodes is 30°. For example, see the angle between output nodes 430 and 431.

Autotransformer configuration 469 can be used as either a step-up transformer or a unity gain transformer. To use configuration 469 as a step-up transformer, either one of two node sets can be selected as input nodes to be linked to supply lines (e.g., see lines 5, 6 and 7 in FIG. 1). The step-up input node sets includes set 400, 401 and 402 and set 405, 406 and 407.

The step-up magnitude between primary and secondary voltages is proportional to the ratio of the lengths of the supply and output voltage magnitude vectors in FIG. 6. For example, the step-up magnitude will be proportional to the ratio of the length of vector 480 to the length of vector 482. The following equation can be formulated from the trigonometric relationship in FIG. 6:

$$\frac{V_{sec}}{V_{pri}} = \frac{\overline{480}}{\overline{482}} = \frac{1}{\sqrt{(\sin 30°(\sin 30° - \cos 30° \tan 15°))^2 + (\cos 15° - (\sin 30° - \cos 30° \tan 15°)\cos 30°)^2}} = 1.34 \qquad \text{Eq. 9}$$

Thus, the voltage step-up magnitude is 34%. Yet another step-up ratio is possible by using input set 410, 411, 412 or set 415, 416, 417. The step-up ratio is the length ratio between vectors 480 and 481, and can be expressed as:

$$\frac{V_{sec}}{V_{pri}} = \frac{\overline{480}}{\overline{481}} = \frac{1}{\cos(15°)} = 1.035 \qquad \text{Eq. 10}$$

The turn ratios for the windings in the configuration of FIG. 6 are identical to the turn ratios for the windings in FIG. 1 and therefore can be represented by the following relationship:

$$\overline{450}:\overline{451}:\overline{452}:\overline{453}:\overline{454}:\overline{455} = 1:1.733:1:1:1.733:1 \qquad \text{Eq. 11}$$

Referring still to FIG. 6, configuration 469 can also be linked to supply lines to provide unity gain. The unity gain input node sets include sets 431, 423 and 427, set 420, 424, and 428, set 421, 425 and 429 and set 422, 426 and 430.

Isolation Transformer Configurations

Figure 7:
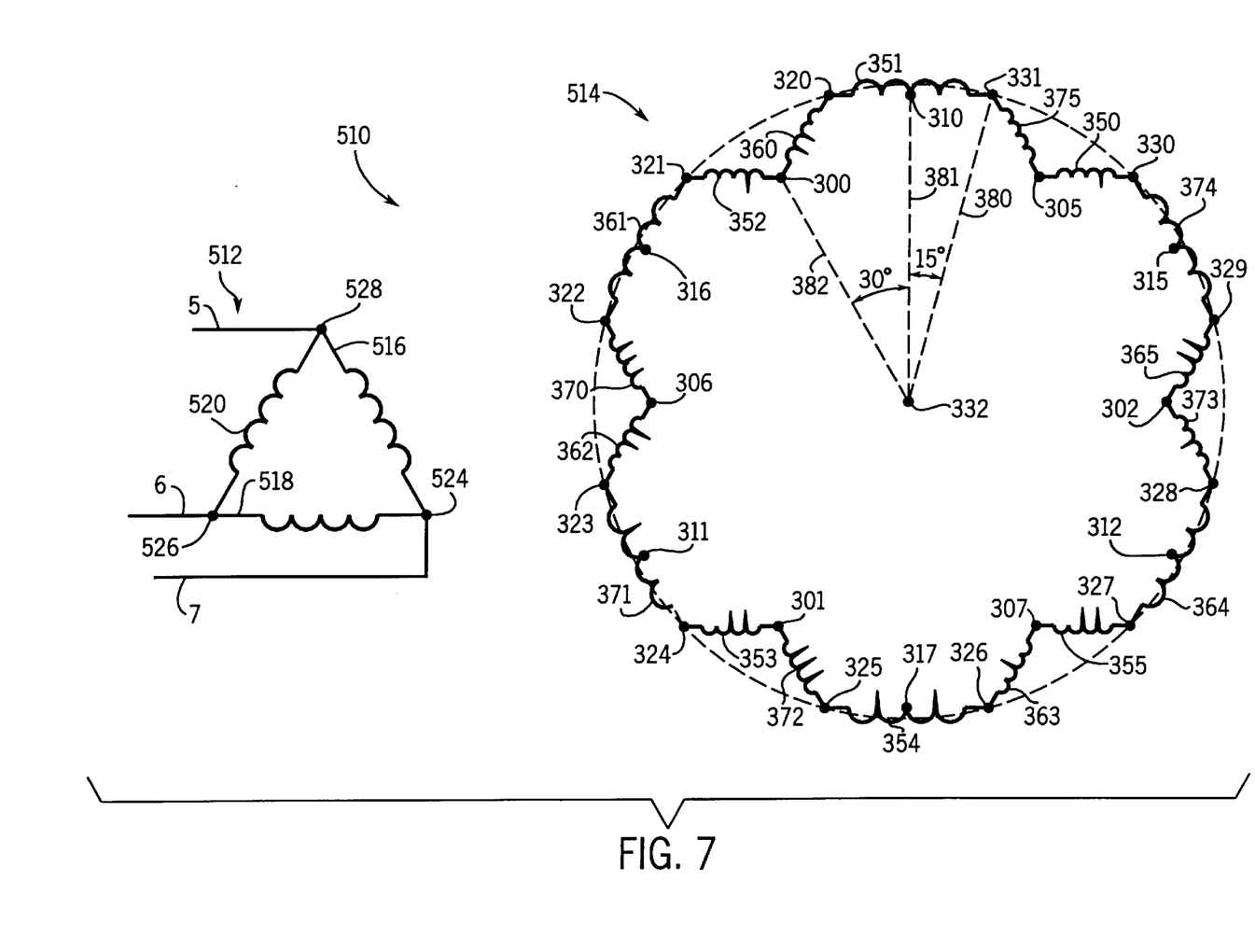
FIG. 7 is similar to FIG. 5, albeit illustrating an isolation transformer where the secondary winding has the same configuration as the step-up/unity gain autotransformer configuration.

Referring now to FIG. 7, an exemplary inventive isolation transformer configuration 510 is illustrated. Configuration 510 includes a primary 512 and a secondary 514. Primary 512 includes three delta wound coils including coils 516, 518 and 520. The coils are arranged such that they are phase-shifted by 120° with respect to each other. Coils 516 and 518 are linked at apice 524, coils 518 and 520 are linked at apice 526 and coils 520 and 516 are linked at apice 528. Although not illustrated in FIG. 7, referring also at FIG. 1 in the isolation transformer embodiment, three phase AC source 9 would be linked via supply lines 5, 6 and 7 to apices 524, 526 and 528, respectively.

Referring still to FIG. 7, secondary 514 has a configuration which is essentially identical to autotransformer configuration 369 in FIG. 5 except that input lines 5, 6 and 7 are linked to primary 512 instead of secondary 514. Because of the similar construction between secondary 514 and configuration 369, similar components in secondary 514 and configuration 369 have been numbered identically and should suffice to indicate the configuration of secondary 514. As with the autotransformer of FIG. 5, secondary nodes are formed by the linking of adjacent windings. Once again, the secondary nodes form twelve output nodes including nodes 320–331.

As illustrated, secondary windings 370–375 are in phase with primary winding 516, secondary windings 350–355 are in phase with primary winding 518 and secondary windings 360–365 are in phase with primary winding 520.

When the input and output lines are linked to primary 512 and secondary 514 as indicated above, the output voltages and currents are phase-shifted by 30° as desired and all of the advantages associated with the autotransformer described above are associated with the isolation transformer illustrated. It should be noted that an additional advantage associated with winding a secondary in a configuration illustrated in FIG. 7 is that a single manufacturing process can be adopted for creating both isolation transformer secondarys and an autotransformer as illustrated in FIG. 5. This dual purpose winding configuration reduces the overall costs associated with adopting a manufacturing line where auto and isolation transformers are required which provide twelve phase transformation.

Figure 8:
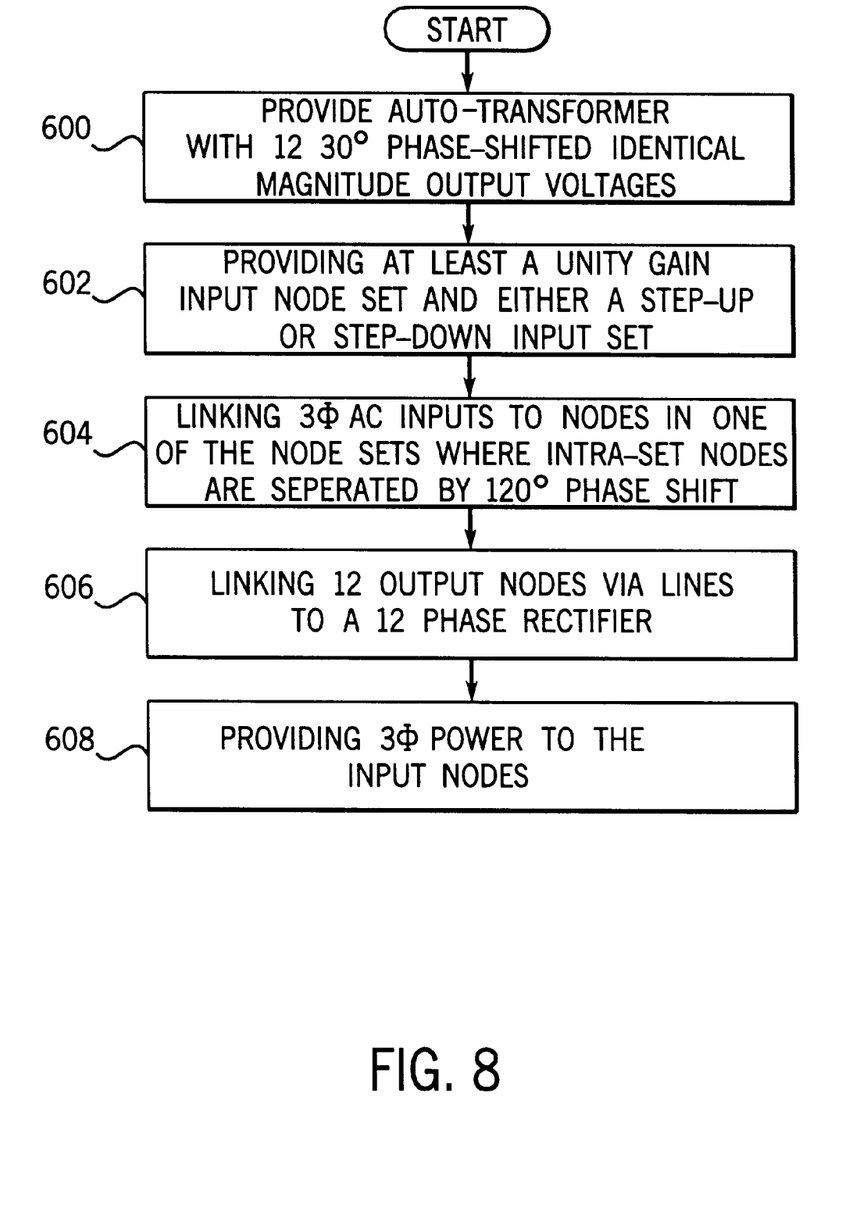
FIG. 8 is a flow chart illustrating an inventive method.

Referring now to FIG. 8, an inventive method for configuring an autotransformer is illustrated. To this end, beginning at step 600, the method includes the step of providing an autotransformer with 12 30° phase-shifted identical magnitude output voltages. Exemplary transformers are illustrated in FIGS. 1, 5 and 6. Continuing, at process block 602, the method includes the step providing at least a unity gain input node set and either a step-up or a step-down input set where the intraset nodes are separated by 120° of phase-shift. At step 604 the method includes linking three-phase AC input lines (e.g., see lines 5, 6 and 7 of FIG. 1) to one of the input node sets (e.g., either a step-up set, a step-down set or unity gain set). At step 606, the 12 output nodes of the autotransformer are linked via lines to 12 inputs of a rectifier. At step 608 three-phase power is provided at the input nodes of the autotransformer and the transformation takes place.

It should be understood that the methods and apparatuses described above are only exemplary and do not limit the scope of the invention, and that various modifications could be made by those skilled in the art that would fall under the scope of the invention. For example, referring again to FIG. 7, while a delta wound primary winding is illustrated, clearly a Wye wound primary could be employed as the advantages related to the delta wound winding are similar to those related to a Wye wound winding. In addition, referring to FIGS. 6 and 7, while a specific secondary winding configuration is illustrated in FIG. 7, clearly the autotransformer configuration 469 of FIG. 6 could be substituted for the secondary configuration 514 thereby providing yet another isolation transformer configuration which would achieve many of the advantages described above.

To apprise the public of the scope of this invention, the following claims are made:

What is claimed is:

1. An autotransformer for converting three-phase AC power provided on first, second and third supply lines to twelve-phase AC power on first through twelfth output lines, the autotransformer comprising:
   a. only first, second and third coils arranged such that there is 120 degree phase shift between coils, each coil including a plurality of serial windings linked together to form a polygon;
   b. an input set including first, second and third input nodes between adjacent windings and separated by 120 degrees, the first, second and third input nodes linkable to the first, second and third supply lines, respectively; and
   c. first through twelfth output nodes between adjacent windings which are linkable to the first through twelfth output lines, respectively;
   d. wherein, the voltage magnitude at each of the nodes is measured by a vector between a neutral point and the node, the windings are sized and arranged such that the phase shift between adjacent output nodes is essentially 30 degrees, the voltage magnitudes at each of the output nodes are essentially identical and the voltage magnitudes at each of the input set nodes are essentially identical.

2. The autotransformer of claim 1 wherein each coil forms six separate windings including first, second, third, fourth, fifth and sixth coil specific windings.

3. The autotransformer of claim 2 wherein the windings are arranged such that the first coil first, second, third, fourth, fifth and sixth windings form first, third, fifth, tenth, twelfth and fourteenth legs, respectively, the second coil first, second, third, fourth, fifth and sixth windings form second, seventh, ninth, eleventh, sixteenth and eighteenth legs, respectively, the third coil first, second, third, fourth, fifth and sixth windings form fourth, sixth, eighth, thirteenth, fifteenth and seventeenth legs and the legs are linked in series first through eighteenth to form the polygon.

4. The autotransformer of claim 3 wherein the first through twelfth output nodes are formed by the connection points between the second and third legs, the third and fourth legs, the fifth and sixth legs, the sixth and seventh legs, the eighth and ninth legs, the ninth and tenth legs, the eleventh and twelfth legs, the twelfth and thirteenth legs, the fourteenth and fifteenth legs, the fifteenth and sixteenth legs, the seventeenth and eighteenth legs and the eighteenth and first legs, respectively.

5. The autotransformer of claim 4 wherein the first, second and third input nodes are formed by the connection points between the eighteenth and first legs, the sixth and seventh legs and the twelfth and thirteenth legs, respectively, such that the autotransformer operates as a unity gain transformer.

6. The autotransformer of claim 4 wherein the first, second and third input nodes are formed by the connection points between the first and second legs, the seventh and eighth legs and the thirteenth and fourteenth legs, respectively, such that the autotransformer operates as a step-up transformer.

7. The autotransformer of claim 6 wherein the input set is a step-up input set and the autotransformer also includes a unity gain set including fourth, fifth and sixth input nodes, the fourth through sixth input nodes being three of the output nodes and separated by 120 degrees of phase shift.

8. The autotransformer of claim 2 wherein the windings are arranged such that the first coil first through third windings are in series forming a first leg, the second coil first through third windings are in series forming a second leg, the third coil first through third windings are in series forming a third leg, the first coil fourth through sixth windings are in series forming a fourth leg, the second coil forth through sixth windings are in series forming a fifth leg and the third coil fourth through sixth windings are in series forming a sixth leg and the legs are in series first through sixth to form the polygon.

9. The autotransformer of claim 8 wherein the first output node separates the first coil first and second windings, the second output node separates the first coil second and third windings, the third output node separates the second coil first and second windings, the fourth output node separates the second coil second and third windings, the fifth output node separates the third coil first and second windings, the sixth output separates the third coil second and third windings, the seventh output separates the first coil fourth and fifth windings, the eighth output separates the first coil fifth and sixth windings, the ninth output node separates the second coil fourth and fifth windings, the tenth output node separates the second coil fifth and sixth windings, the eleventh output node separates the third coil fourth and fifth windings and the twelfth output node separates the third coil fifth and sixth windings.

10. The autotransformer of claim 9 wherein the first, second and third input nodes are three of the output nodes so that the transformer operates as a unity gain transformer.

11. The autotransformer of claim 9 wherein the first, second and third input nodes are formed by connection points between transformer legs and the voltage magnitude at each of the input nodes is greater than each of the output node voltage magnitudes such that the transformer operates as a step-down transformer.

12. The autotransformer of claim 9 wherein the first, second and third input nodes are formed by mid-winding connection points of the first coil second winding, the third coil second winding and the second coil fifth winding and the voltage magnitude at each of the input nodes is less than each of the output node voltage magnitudes such that the transformer operates as a step-up transformer.

13. The autotransformer of claim 1 wherein each of the first through third coils forms first through seventh windings, each first through fifth winding being a series winding and each of the sixth and seventh windings being stub windings, the first coil first through fifth windings forming first, third, fifth, ninth and twelfth legs, the second coil first through fifth windings forming second, sixth, eighth, tenth and fourteenth legs and the third coil first through fifth windings forming fourth, seventh, eleventh, thirteenth and fifteenth legs, respectively, the legs arranged in series first through fifteenth to form the polygon, one end of each of the first coil sixth and seventh stub windings connected to a node between the fifteenth and first legs, the other end of the first coil sixth winding forming one of the output nodes, the other end of the first coil seventh winding forming another of the output nodes, one end of each of the second coil sixth and seventh stub windings connected to a node between the fifth and sixth legs, the other end of the second coil sixth winding forming one of the output nodes, the other end of the second coil seventh winding forming another of the output nodes, one end of each of the third coil sixth and seventh stub windings connected to a node between the tenth and eleventh legs, ends of the stub windings, the other end of the third coil sixth winding forming one of the output nodes, the other end of the third coil seventh winding forming another of the output nodes, the other six output nodes formed by the nodes between the second and third legs, the third and fourth legs, the seventh and eighth legs, the eighth and ninth legs, the twelfth and thirteenth legs and the thirteenth and fourteenth legs, respectively.

14. The autotransformer of claim 2 wherein the polygon is a hexagon.

15. The autotransformer of claim 4 wherein the first, second and third input nodes include nodes that bi-sect the first coil second winding, the second coil third winding and the third coil third winding, respectively, such that the autotransformer operates as a step-up transformer.

16. A method for converting three-phase AC power provided on first, second and third supply lines to twelve-phase stepped down AC power on first through twelfth output lines, the method comprising the steps of:
   a. providing an autotransformer having only first, second and third coils, each coil having a plurality of serial windings linked together to form a polygon having nodes between adjacent windings, the nodes including at least first through twelfth output nodes, node voltage magnitudes measured by vectors between a neutral point and each node, the windings sized and arranged such that the phase shift between adjacent output nodes is essentially 30 degrees and the voltage magnitudes at the output nodes are essentially identical;
   b. linking the first, second and third supply lines to first, second and third input nodes between adjacent windings, respectively, the input nodes separated by 120 degrees and having essentially identical voltage magnitudes;
   c. linking the first through twelfth output lines to the first through twelfth output nodes, respectively; and
   d. providing the three-phase AC power to the first through third input nodes.

17. The method of claim 16 wherein the step of providing the autotransformer includes the step of providing at least one step-up input node set wherein the voltage magnitudes at each of the step-up input nodes is less than the output node voltage magnitudes and the step of linking the supply lines includes linking the supply lines to the step-up node set.

18. The method of claim 16 wherein the step of providing the autotransformer includes the step of providing at least one step-down input node set wherein the voltage magnitudes at each of the step-up input nodes is greater than the output node voltage magnitudes and the step of linking the supply lines includes linking the supply lines to the step-down node set.

19. The method of claim 16 wherein the step of providing the autotransformer includes the step of providing at least one unity gain input node set wherein the voltage magnitudes at each of the unity gain input nodes is equal to the output node voltage magnitudes and the step of linking the supply lines includes linking the supply lines to the unity gain node set.

20. An isolation transformer for converting three-phase AC power provided on first, second and third supply lines to twelve-phase AC power on first through twelfth output lines, the autotransformer comprising:
   a. a primary including first, second and third primary coils configured so as to be separated by 120 degrees and forming first, second and third input nodes, the first, second and third input nodes linkable to first, second and third supply lines, respectively;
   b. a secondary including:
      (i) only first, second and third coils arranged such that there is 120 degree phase shift between coils, each coil including a plurality of serial windings linked together to form a polygon; and
      (ii) first through twelfth output nodes between adjacent windings which are linkable to the first through twelfth output lines, respectively;
      (iii) wherein, the voltage magnitude at each of the output nodes is measured by a vector between a neutral point and the node, the windings are sized and arranged such that the phase shift between adjacent output nodes is essentially 30 degrees and the voltage magnitudes at each of the output nodes are essentially identical.

21. The transformer of claim 20 wherein each secondary coil forms six separate windings including first, second, third, fourth, fifth and sixth coil specific windings.

22. The transformer of claim 21 wherein the secondary windings are arranged such that the first coil first, second, third, fourth, fifth and sixth windings form first, third, fifth, tenth, twelfth and fourteenth legs, respectively, the second coil first, second, third, fourth, fifth and sixth windings form second, seventh, ninth, eleventh, sixteenth and eighteenth legs, respectively, the third coil first, second, third, fourth, fifth and sixth windings form fourth, sixth, eighth, thirteenth, fifteenth and seventeenth legs and the legs are linked in series first through eighteenth to form the polygon.

23. The transformer of claim 22 wherein the first through twelfth output nodes are formed by the connection points between the second and third legs, the third and fourth legs, the fifth and sixth legs, the sixth and seventh legs, the eighth and ninth legs, the ninth and tenth legs, the eleventh and twelfth legs, the twelfth and thirteenth legs, the fourteenth and fifteenth legs, the fifteenth and sixteenth legs, the seventeenth and eighteenth legs and the eighteenth and first legs, respectively.

24. The transformer of claim 20 wherein each of the secondary first through third coils forms first through seventh windings, each first through fifth winding being a series winding and each of the sixth and seventh windings being stub windings, the first coil first through fifth windings forming first, third, fifth, ninth and twelfth legs, the second coil first through fifth windings forming second, sixth, eighth, tenth and fourteenth legs and the third coil first through fifth windings forming fourth, seventh, eleventh, thirteenth and fifteenth legs, respectively, the legs arranged in series first through fifteenth to form the polygon, one end of each of the first coil sixth and seventh stub windings connected to a node between the fifteenth and first legs, the other end of the first coil sixth winding forming one of the output nodes, the other end of the first coil seventh winding forming another of the output nodes, one end of each of the second coil sixth and seventh stub windings connected to a node between the fifth and sixth legs, the other end of the second coil sixth winding forming one of the output nodes, the other end of the second coil seventh winding forming another of the output nodes, one end of each of the third coil sixth and seventh stub windings connected to a node between the tenth and eleventh legs, ends of the stub windings, the other end of the third coil sixth winding forming one of the output nodes, the other end of the third coil seventh winding forming another of the output nodes, the other six output nodes formed by the nodes between the second and third legs, the third and fourth legs, the seventh and eighth legs, the eighth and ninth legs, the twelfth and thirteenth legs and the thirteenth and fourteenth legs, respectively.

25. The transformer of claim 20 wherein the polygon is a hexagon.

* * * * *